United States Patent [19]

Fritzler

[11] 4,126,386
[45] Nov. 21, 1978

[54] IMAGE STABILIZATION SYSTEM FOR CONTINUOUS FILM SCANNING APPARATUS

[76] Inventor: Ulrich M. Fritzler, 65-15 Booth St., Rego Park, N.Y. 11374

[21] Appl. No.: 842,980

[22] Filed: Oct. 17, 1977

Related U.S. Application Data

[63] Continuation-in-part of Ser. No. 721,892, Sep. 9, 1976.

[51] Int. Cl.² ............................................. G03B 41/02
[52] U.S. Cl. ..................................... 352/105; 352/106; 352/108; 352/111
[58] Field of Search ............... 352/105, 106, 107, 108, 352/110, 111

[56] References Cited

U.S. PATENT DOCUMENTS

| 1,154,835 | 9/1915 | Bauersfeld | 352/105 |
| 1,513,984 | 11/1924 | Griffith | 352/108 |

FOREIGN PATENT DOCUMENTS

| 563,520 | 11/1932 | Fed. Rep. of Germany | 352/105 |
| 20,010 | 10/1915 | France | 352/105 |

*Primary Examiner*—Monroe H. Hayes
*Attorney, Agent, or Firm*—Harold L. Jackson; Stanley R. Jones; Joseph W. Price

[57] ABSTRACT

An optical scanner system such as a projector for the continuous transmission of images to provide image immobilization is provided. The optical scanner system includes an illumination system, a scanner mechanism, and a projection lens system. The scanner mechanism is capable of creating virtual images of successive film frames with at least one virtual image point of each film frame positioned on a stationary locus point and at least another virtual image point offset from the stationary image locus point and relatively movable during a scanning movement. The scanner mechanism can, for example, be of a reflective or refractive polygon geometry. The specific parameters of the projection lens system and illumination system recognizes the inherent limitations of the dynamic keystoning aberration in scanner assemblies and seeks to nullify its effect in the projected real image. The projection means is of a telecentric design. The illumination system is matched to the vignetting capabilities of the scanner and projection system to selectively illuminate different regions of a real image of each film frame so that the light transmission is progressively decreased in the region of each film frame when the relative movement of the real offset image point becomes progressively greater. Basically, the system deluminates during the greatest rate of defocusing of the real image.

30 Claims, 10 Drawing Figures

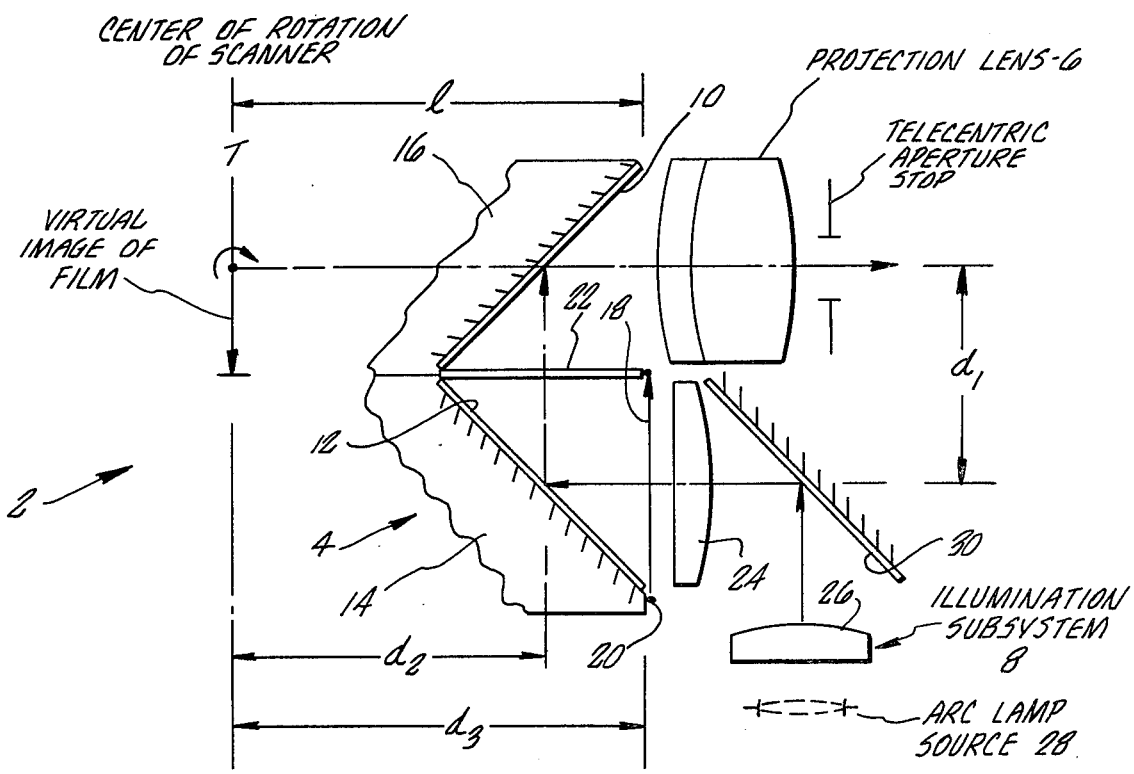
FIG_1
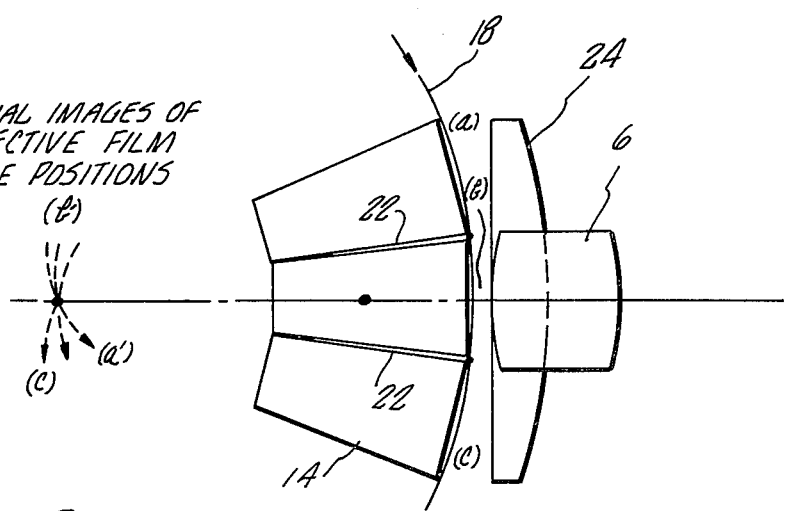
FIG_2

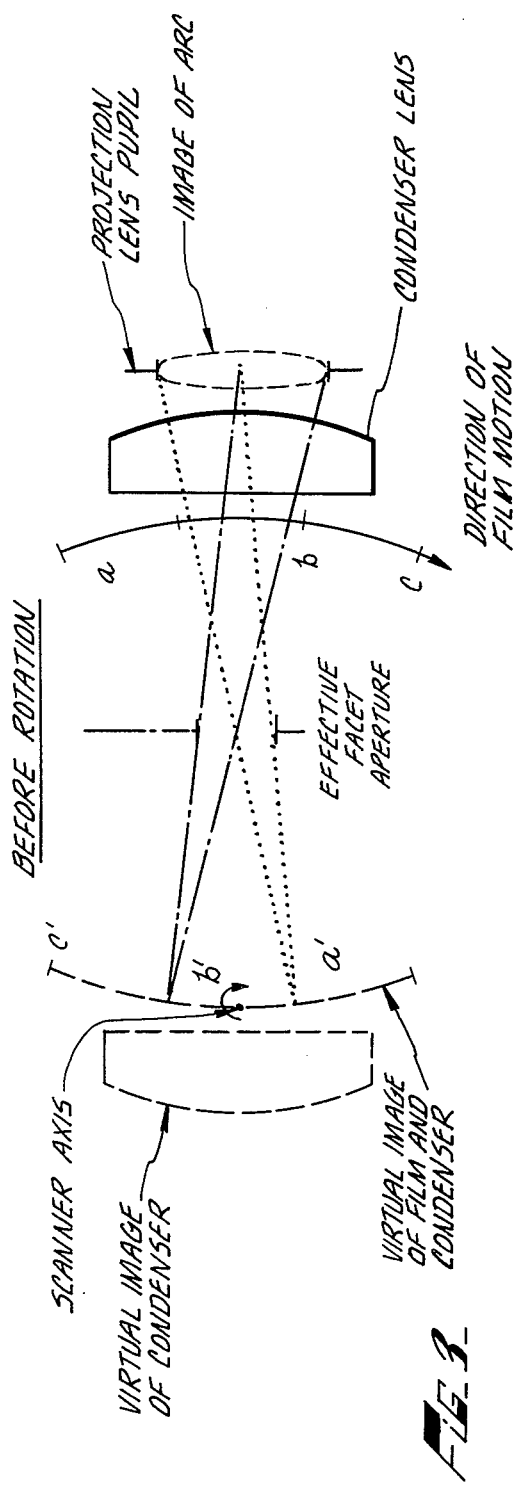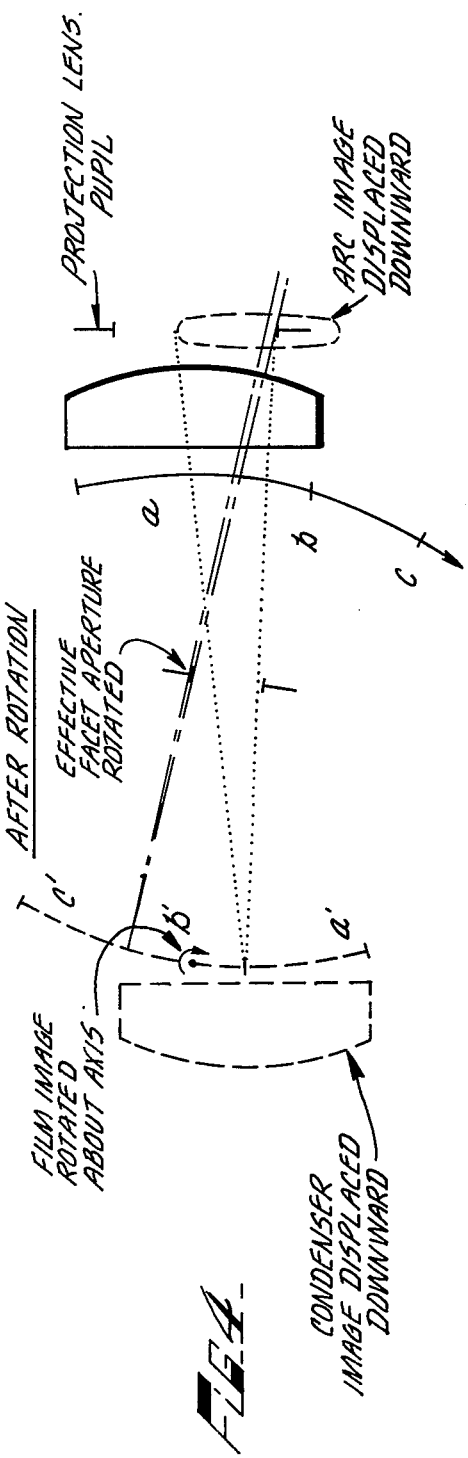
FIG. 3.
FIG. 4.

REAL IMAGE PLANE MOTION
PRODUCED BY DYNAMIC KEYSTONE
ABERRATION

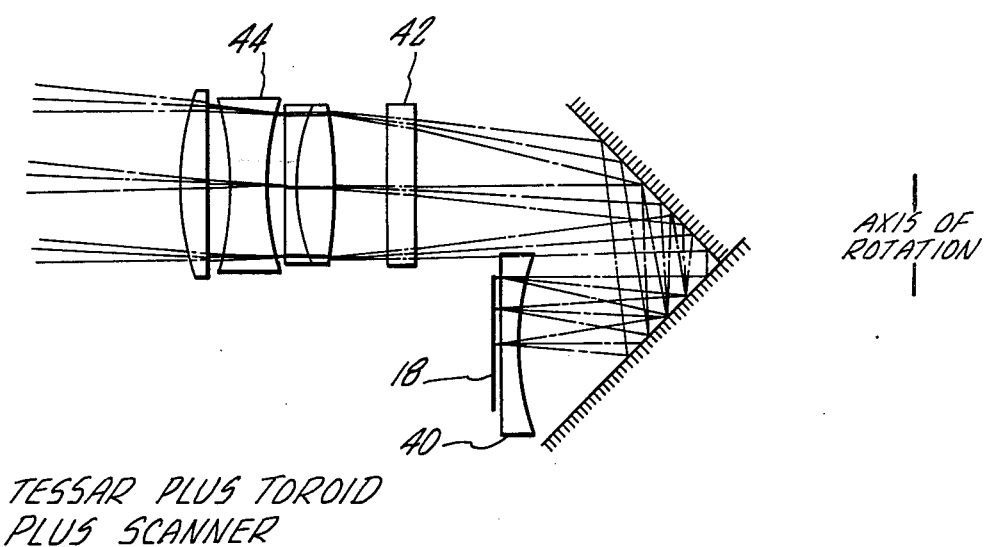
TESSAR PLUS TOROID
PLUS SCANNER
FIG. 10.  PROJECTION LENS INCLUDING SCAN MIRRORS AND FIELD CORRECTOR

IMAGE STABILIZATION SYSTEM FOR CONTINUOUS FILM SCANNING APPARATUS

RELATED PATENT APPLICATIONS

The present application is a continuation-in-part application of, U.S. patent application Ser. No. 721,892 filed Sept. 9, 1976 for IMPROVED ROOF REFLECTIVE POLYGON SCANNING APPARATUS by the same inventor.

BACKGROUND OF THE INVENTION

1. Field of the Invention

The present invention relates to an optical immobilization apparatus for producing stationary images onto or from a relatively moving object such as a continuously moving film strip and more particularly to an improved illumination and projection lens system for complementing a scanner assembly that is suitable for incorporation into projectors, cameras and optical scanning equipment to optically immobilize a moving image with relatively minimal distortion.

2. Description of the Prior Art

While the subject matter of the present invention is directed to a modular optical apparatus that can be incorporated as an essential component in a number of optical devices, reference will be made primarily to the field of motion pictures.

The conventional projection of motion pictures has required an intermittent-motion film transport mechanism. The conventional projector has traditionally produced objectionable noise, film wear, frame and screen registration errors and frame rate limitations. The noise that is typically created by the intermittent-motion projection system, has required a projection booth in a commercial environment. The required intermittent movement not only damages the perforations in the film but the continuous starting and stopping effects cause severe speed limitations. Frequently, the projected images appear to bounce due to vertical instability and flicker is still present in conventional equipment. Additionally, the intermittent motion creates interfacing problems between the correlations of the sound and visual characteristics of the motion picture.

In one conventional projector, a three bladed shutter, wherein each blade has a 55° sweep, will block a total of 165° of a total of 360° of illumination. In effect, this means that 46% of the time the screen is blackened due to the light loss related to the shutter effect. This reduces the apparent image illuminance correspondingly by 46%. In addition, the complicated structure of the intermittent-motion transport requires a complex interfacing of the film into the projector.

A conventional projector when utilized in a video converter application requires a compensator to immobilize the film frame on the screen for solving the synchronization problem associated with the normal projection rate of 24 frames per second of a motion picture film interfaced with the 30 fields per second scanning of the typical video system.

Various forms of optical compensating devices, have been suggested over the last sixty years. Optical compensators or image immobilizers have classically fallen under these separate categories; rotating and/or oscillating mirror devices, rotating lens devices and rotating polygon prism devices. The German built Mechau projector of U.S. Pat. No. 1,401,346 is a classical example of a mirror type of optical compensator. The Mechau projector was built in the 1920's and was apparently the first technically successful continuous projector.

The Alexanderson U.S. Pat. No. 2,937,378 and the Ripley et al U.S. Pat. No. 1,091,864 disclose relatively simple polygon reflecting projectors.

The Bauersfeld U.S. Pat. No. 1,154,835 is of particular interest since it discloses a reflector drum which has a reflector comprising three planar reflectors having perpendicular reflecting surfaces which are respectively lying along a Cartesian coordinate with a film window limiting the illumination to one of the film frames. The inventor recognized that image movement particularly at the outer edges of a frame was a problem. The solution offered, however, causes dynamic distortion and defocussing over the whole image during scan. The limitation of illuminating a single film frame creates definite light flicker in the real image.

The Campbell U.S. Pat. No. 3,583,798 discloses a high speed camera incorporating an optical compensator comprising a centrally fixed mirror for directing a light ray outward to a reflective rhombic configuration.

The Miller U.S. Pat. No. 1,530,903, Barr U.S. Pat. No. 663,153 and U.S. Pat. No. 1,156,596, Flogaus et al U.S. Pat. No. 3,885,857, Dahlquist U.S. Pat. No. 3,889,102 and Rotter U.S. Pat. No. 3,894,800 are cited of general interest.

The Thun German Pat. Nos. 547,240 and 563,520 are directed to a lenticular lens system for high speed photography.

Rotating lens devices have been less successful than the mirror devices or other methods due to the aberration problems and the cost requirement for precision lenses.

Examples of the rotating prism optical compensators can be found in the Leventhal U.S. Pat. Nos. 2,085,594; 2,417,002 and RE22,960. The Tuttle U.S. Pat. No. 2,070,033, Eisler U.S. Pat. No. 2,262,136 and Husted U.S. Pat. No. 3,539,251 are other examples of prism optical compensators.

Optical immobilization can be described as a displacement of a light beam through the optical system in such a manner that the portion of the beam coming from the subject, in the case of a camera taking a picture, or the portion of a beam extending from the projector to the screen, in the case of a motion picture projection, is held rigidly stationary, centered at the optical axis of exposure or projection respectively, while the portion of the beam which is immediately adjacent the intersecting film, is optically displaced so as to move in synchronism with the movement of the film. A recurrent problem that has been experienced is the inability to stabilize a virtual image during kinetic motion of the scanner system which, during a resultant projection and magnification has produced image movement on the screen. This problem has been frequently characterized as dynamic keystoning.

The use of a rotating solid polygonal prism can produce a refraction of a light beam as it enters the prism and again as it leaves the prism to offset or displace a section of the beam within the apparatus, while maintaining the displaced section parallel to the stationary portion of the beam. The displaced section of the light beam directly intersects the film with the displacement being of a progressive wiping nature such that the displacement portion of the beam continually moves in exact synchronism with the moving film.

A solid polygon having an appropriate refractive index can provide frame lap dissolve. The refractive index would have to be in the order of 2.0 and the corresponding aberration control would demand a minimum of 26 facets which implies a maximum relative aperture of approximately f/7. In realizable solid polygon systems a refractive index of approximately 2.0 cannot be achieved and each successive projected frame replaces its predecessor frame in a top to bottom "wiping" motion with an inherent flicker that requires a corrective shutter between the frames.

An optical compensator that was developed for the Philco Research Division for use as a motion picture film scanner for television transmission in the early 1950's recognized some of the problems of a solid polygon. The Kudar U.S. Pat. Nos. 2,977,280 and 2,860,542 described this work. Basically, the Kudar patents disclose a hollow polygon device which utilized a set of prisms located within a cylindrical cavity of the polygon to deviate the light beam sufficiently to permit a lap dissolved framing which was flicker free, required no shutter, achieved a moderate relative aperture, for a 24 facet system, while at the same time provided moderate control of optical aberrations and film shrinkage compensation. The Kudar devices as described in the patents were developed upon the theory that the parallelism of the stationary and displaced portions of the projected beam required, the beam to be refracted to the same extent upon entering and leaving the polygon prism. Some of the advantages of the Kudar system include a limitation of the relative aperture of the optical system, the requirement of expensive materials for the prisms, the existence of field curvature aberrations and other refractive optical aberrations which are particularly destructive in a projection system. The Kudar device, however, has been utilized as a color television film scanner as described in the paper, "New 35 mm Television Film Scanner" Journal of SMPTE, Vol. 62, January 1954, Page 45. The Kirkham U.S. Pat. No. 2,817,995 suggests a modification of a hollow polygonal prism concept by the provision of a rotatable compensating core to permit adjustment for the film shrinkage.

The Korb U.S. Pat. No. 2,515,453 is cited of general interest to disclose a single pass prism optical compensator.

Some devices of the prior art are capable of providing flicker-free lap dissolve framing, no shuttering and film shrinkage adjustment. For example the Kudar device taught the extension of the optical path through the compensator and the compensation of film shrinkage by the various mounting of movable prisms within the hollow polygon. The result was accomplished with relatively expensive components and provided a limited relative aperture while introducing kinetic refractive aberrations.

Problems such as image displacement, dynamic keystoning and ghost images still exist when applying prior art polygon reflective scanners to motion picture projectors and cameras. Thus, problems become fully apparent when the image is magnified, for example, for motion picture projection. To date, the prior art has directed their primary efforts at modifying the scanner assembly to remove these problems. The present invention recognizes the inherent limitations of practical scanner configurations and nullify the effects of these inherent limitations such as dynamic keystoning by providing corrective illuminating and projection systems that permit commercial magnification of an image without discernible image movement by a viewer.

SUMMARY OF THE INVENTION

The present invention provides a rotatable optical scanner system for the transmission of at least two dimensional successive images of objects to provide an image immobilization. As can be appreciated, the objects can be considered reformed from a number of discrete points. A scanner assembly creates virtual images of successive objects with at least one virtual image point of each object positioned on a stationary locus point and at least another virtual image point offset from the stationary virtual image locus point and relatively movable during a scanning movement. This relative movement can be characterized as dynamic keystoning in the projected real image.

The present invention recognizes this inherent limitation in practical scanner geometries and seeks to provide a specific projection lens assembly and illumination system which tends to nullify the effects of dynamic keystoning. In this regard, the optical scanner system limits the effective transmission of a pencil of rays of the offset virtual image point from an object to substantially a tangetial interface with a surface of focused real image point positions. The surfaces being representative of the effective rotational scan movement of the projected offset real image point. The use of a projection means with a telecentric property and a particular illumination system that permits a vignetting of a transmitted light rays so that they selectively illuminate different regions of the real image of each film frame whereby the light transmission will be progressively decreased in the region of each film frame when the relative movement of the real offset image point becomes progressively greater are features of the present invention. Thus, by selecting appropriate number of facets to provide a rotation scan angle that is optimum for the particular application, it is possible to in effect, decrease the light transmission to that portion of the projected real image that is experiencing the greatest rate of defocussing thereby effectively removing this source of perceptible image motion from the projected real image so that the viewer will perceive a continuous projection of images.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a schematic partial elevated view of a scanner system of the present invention;

FIG. 2 is a schematic partial top view of FIG. 1;

FIG. 3 is a schematic view disclosing the illumination system for a three mirror scanner before rotation;

FIG. 4 is a schematic view disclosing the three mirror scanner illumination after rotation;

FIG. 10 is a schematic of a projection lens system.

BRIEF DESCRIPTION OF THE PREFERRED EMBODIMENTS

Figure 5:
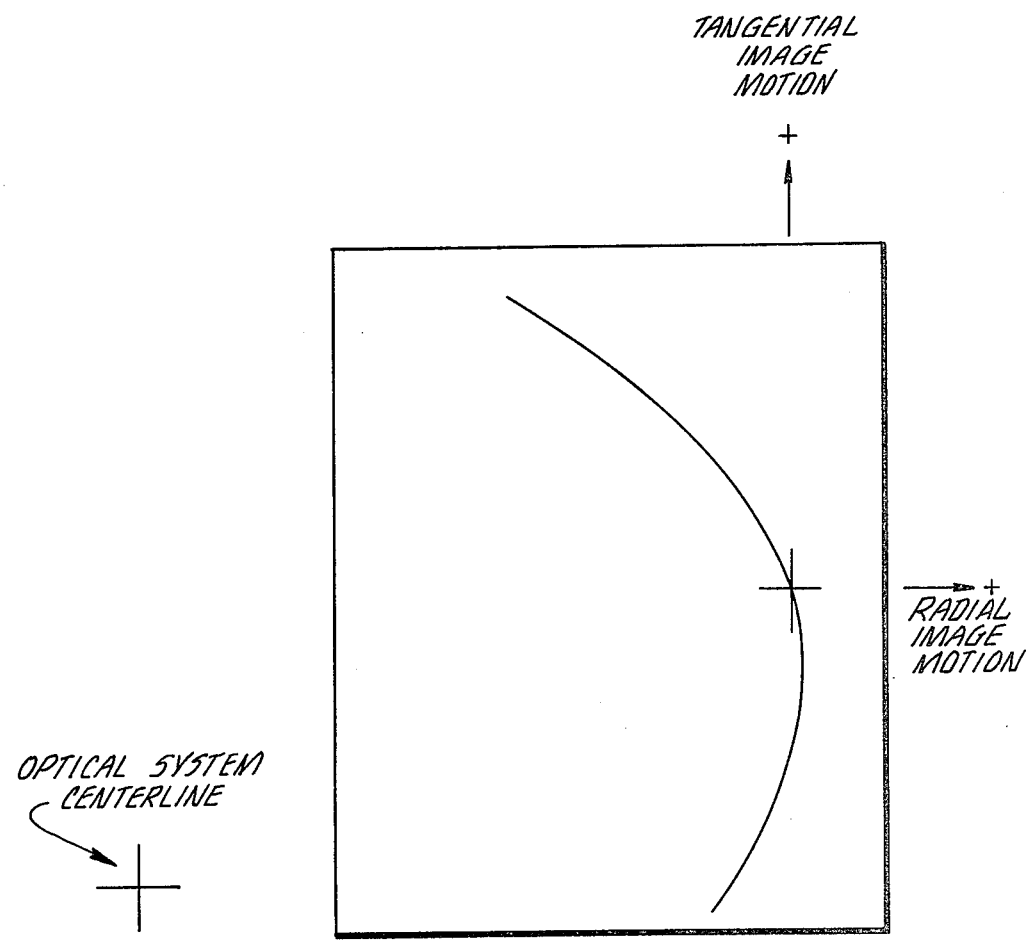
FIG. 5 is a plot of the real image plane motion produced by dynamic keystone aberration.

The following description is provided to enable any person skilled in the optical art to make and use the invention and sets forth the best modes contemplated by the inventor of carrying out his invention. Various modifications, however, will remain readily apparent to those skilled in the art since the generic principles of the present invention have been defined herein specifically to provide a modular optical device that can be manufactured in a relatively economical manner.

Frequently, the term optical compensator or optical immobilization will be utilized to describe a desired function of the present invention. In this regard, reference is made to the Kudar U.S. Pat. Nos. 2,972,280 and 2,860,542 which are incorporated herein by reference simply to supplement the disclosure with respect to terminology and the theory relating to optical immobilization.

The present invention relates to a modular optical device capable of performing a basic image transmitting operation that could be incorporated into a large number of optical systems such as a camera, movie editing table, dissolving slide projector, tele-cine converters and optical scanning or image immobilization equipment. The preferred embodiments herein will be disclosed in a projector system that is capable of being commercially utilized. Obviously, other applications of the basic scanner assembly would require modification such as a rotating shutter in a camera embodiment.

It should also be appreciated that the present invention can be utilized across the spectrum of energy transmission and is not limited specifically to the visual spectrum of 400 nanometers to 700 nanometers. Utilizing the term light or light rays, should be understood to be broad enough to encompass both the ultraviolet and infrared range of energy in addition to the visual spectrum.

Referring to FIG. 1, a partial schematic elevated cross-sectional view of the optical scanner system 2 of the present invention is disclosed.

The optical scanner system 2 can be broadly subdivided into three major sub-components; that is, the scanner assembly 4, the projection lens assembly 6 and the illumination assembly 8.

The actual scanner assembly 4 configuration is a pair of polygonal drums having planar reflective facets 10 and 12 positioned at a 90° angle to each other. In an alternative embodiment, one half of a respective reflective member can be replaced by a 90° roof angle formed from a pair of individual roof mirrors. The choice of planar reflective facets with 90° roof angle facets does not effect the basic image transmission but would require a variance in the supportive illumination assembly design. The number of mirror pairs or reflective members 10 and 12 that are utilized is partially dictated by the accuracy of the intended application of the polygon scanner configuration of the present invention.

Advantageously, each of the polygon reflecting members that forms the scanner assembly 4 can be injection molded from plastic or either receive the individual reflecting members 10 and 12 or to directly provide surfaces that can be coated with reflecting material. The respecting polygon reflecting members can be appropriately fastened together to align the respective reflecting segments 10 and 12 on each member and for movement conjointly. As can be seen, the lower polygon reflecting member 14 can be provided with appropriate sprockets designed to intermesh with perforations in the film strip 18. As can be readily realized, a film transport system (not shown) can be utilized to drive the film strip 18 which in turn can drive the scanner assembly 4. Conversely, the polygon scanner assembly 4 can be utilized to drive the film strip 18. The use of additional guide rollers, reels and audio equipment are obvious expedients known to those skilled in the art and accordingly, are not disclosed or necessary for an understanding of the present invention.

A film sprocket 20 on the lower polygon reflecting member 14 includes cross bars 22 which are relatively positioned, as can be seen in the cross-sectional top view of FIG. 2, between the respective upper and lower polygon reflecting members to provide an advantageous baffling effect to help eliminate optical cross talk between reflective facets or ghost images in the projected real image.

It should be realized that in an actual embodiment of the scanner assembly 4, the respective lower polygon reflective member 14 and upper polygon reflective member 16 can be mounted for relative movement for adjustment to maintain a composite registration of the film frames, if any adjustment is required due to shrinkage or expansion of the film.

Referring again to FIG. 1, the film strip 18 is schematically shown with the optical axis extending through the centric of a frame. The optical axis can be traced from the lower polygon reflective member 14 upward to the upper polygon reflective member 16, to extend outward through the projection lens assembly 6 parallel to the radially inward optical axis. The distance, $d_1$, is the distance between the radially inward extending light trace from the centric of the film frame and the radially outward extending optical axis for the projection of the image, in other words, $d_1$ is the distance between either a reflecting facet or roof mirror intersection on the lower polygon reflecting member 4 and a reflecting facet or roof mirror intersection on the upper polygon reflecting member 16 along the optical axis; $d_2$ is the distance from a common axis of rotation or center of rotation of the scanner to the optical axis between the lower and upper polygon reflecting members 14 and 16. $d_2$ can also be described as a distance from the axis of rotation to a plane containing the reflected transmission energy beam along the optical axis between the upper and lower polygon reflecting members. $d_3$ is the distance from the common axis of rotation to the film strip 18 or an object being scanned. The distance 1 refers to the back focal length of the projection lens assembly 6. The specific set of dimensions for a particular film format can be derived from the geometry of a polygon. For example, a 26 facet polygon scanner and a 35 mm film format would have dimensions derived as follows:

$d_1 = 1.500$ $d_2 = 2.298$ $d_3 = 3.095$

The relationship between these distances can be expressed as follows:
$d_3 = 2d_2 - d_1$ The specific dimensions given were derived for a 35 mm cine format with a 0.748 inch frame separation and a 26 facet scanner geometry. All other formats and facet geometries are equivalent in concept to this specific case and can be easily derived by an optical designer from the present disclosure.

The embodiment of FIGS. 1 and 2 and the mathematical analysis was performed with a 24 facet scanner geometry.

Referring to the illumination sub-system 8, it performs an important function in minimizing dynamic keystoning in the design of the scanner assembly 4. As can be seen, a pair of condensors 24 and 26 are utilized with an HMI AC arc lamp 28, such as a 575 watt HMI AC arc lamp having a 12 mm arc length. The arc length is important, since the condensor elements 24 and 26 combine to magnify the arc by a factor of about 1 to form an image slightly forward of the cross bars 22 or baffle spokes. One or more folding mirrors 30 can be inserted into the illumination assembly 8. The actions of the mirrors 30 are such to orient the arc image so that the long direction of the arc image is in the direction of motion of the film 18. The second condensor 24 is large enough so that three frames of the film are simultaneously illuminated with a plane reflecting facet geometry for the upper and lower polygon reflecting members.

As will subsequently be seen with the use of a 90° roof reflector, the condensor 24 would be redesigned so that only two frames of the film need be simultaneously illuminated.

The projection lens assembly 6 is designed with its field curvature complementing the cylindrical film surface so that it is capable of imaging the curved virtual image that passes through the center of rotation of the scanner into a real image on a screen. The projection lens assembly 6, has a telecentric property.

The scanner assembly 4 is fundamental to the operation of the optical scanner system 2. Ideally, the scanner assembly is designed so that it does not introduce any aberrations of its own while it performs its function of continuously changing from one frame to the next without introducing any image motion or intermittent illumination changes. The preferred embodiment disclosed utilizes planar mirrors which will not introduce any aberrations provided the surfaces are appropriately flat and properly aligned.

In the initial experimental work, the projection lens 6 was an achromat doublet purchased from Jaegers of Long Island, New York, part number 14D3411, having a double convex, with the negative side facing the scanner assembly. A circular aperture stop was used. The focal length was 94 mm.

The film condensor 24 was plano/convex with a focal length of 75 mm and diameter of 60 mm. The light condensor 26 was also plano/convex with a food length of 45 mm and diameter of 65 mm.

The film condensor 24 was positioned as close as possible to the film plane while still not focusing any dust on the surface of the condensor, that is approximately 10 mm. The light condensor distance to the 12 mm arc of the lamp was 40 mm.

While not shown, an extra heat reflecting mirror could be inserted in the illumination subsystem 8.

As alternative embodiments, the more conventional refractive prisms could also be utilized with appropriate adjustments, for example, to compensate for chromatic aberrations.

Referring to FIG. 2, it can be seen that the action of the mirror facets in the scanner assembly is to place a virtual image of the curved film frame at the axis of rotation of the scanner, but displaced in such a way that it is centered on the optical axis of the projection lens. As can be appreciated a two dimensional image can be considered to be formed from a number of discrete points and for the purposes of the present disclosure it can be seen that at least one virtual image point of each film frame will be positioned on a stationary locus point of the center of rotation of the scanner. Actually, a line of points will be imaged along the axis of rotation which will remain stationary as the scanner assembly 4 is rotated. Thus, this portion of the film frame will appear to remain stationary when two or more facets and film frames are simultaneously illuminated and light from both are directed into the projection lens 6.

Thus, two successive images will appear simultaneously superimposed on the screen or real image plane. The rotation of the scanner assembly will cause one of the film frame real images to fade out as the other begins to dominate. As can also be appreciated, a single image will be projected when the normal to the center of a film frame is parallel to the optical axis of the projection lens as shown in FIG. 2. As can be further seen from FIG. 2, as the scanner rotates the virtual image formed by the mirrors is only truly stable along the axis of rotation and the off axis virtual image points will rotate at the same rate as the scanner assembly 4. The resulting effect on the projected real image is to produce what can be called dynamic keystoning. That is, the offset virtual image point will be relatively movable to the stationary locus point during a scanning movement. The result of dynamic keystoning is to provide position dependent real image motions on the screen that are perceptible to the viewer and are accented during any magnification of the virtual image onto the real image plane. The net effect at the real image screen is a projected real image that begins tilted, gradually becomes co-planar with the image screen and finally becomes tilted with respect to the screen in a direction opposite to the initial tilt. The actual visual effect perceived by the viewer is a geometric stretching at the corners of the projected real image accompanied by a loss in resolution. This effect perceived by the viewer can be defined as dynamic keystone distortion.

As can be further appreciated from FIG. 2, the curved film strip 18 will likewise produce a curved virtual image about the center of rotation. The particular choice of a film surface about a centroid of the stationary locus point or axis of rotation of the scanner is important in preventing a lateral displacement of the image which would be experienced with a flat film plane. In the mathematical embodiment disclosed for the scanner assembly 4, 24 sets of mirrors were selected so that each facet would subtend an angle of 15° of the axis of rotation.

The present invention recognizes that the scanner assembly by itself is the source of dynamic keystoning and this effect can only be minimized and not eliminated with a practical scanner geometry. The present invention has accomplished this minimization by a projection lens design and by the controlled interaction between the scanner assembly 4 and the illumination system.

Mathematically, the imaging properties of the polygon reflecting facets can be represented by a transformation matrix using a four-by-four element matrix describing the properties of the reflecting scanner facets.

For purposes of reference to this mathematical approach the article "Mirror-Image Kinematics" by Joseph S. Beggs, Journal of the Optical Society of America, Volume 50, Number 4 (April 1960) pp. 388-393 is incorporated herein by reference.

Thus, an object point P(x,y,z) on the film surface can be related to its virtual image point p'(x',y',z') located at the virtual image position described above by a simple matrix transformation. For a three mirror scanner this transformation is:

$$\begin{bmatrix} \overset{1}{X'} \\ Y' \\ Z' \end{bmatrix} = \begin{bmatrix} -X\cos\theta + Z\sin\theta \\ -Y \\ X\sin\theta - Z\cos\theta \end{bmatrix}$$

This mathematical analysis is equally applicable to both a planar reflective facet or a 90° roof reflector, but is shown herein for the 90° roof reflector scanner for simplicity.

A distortion-free lens will project the virtual image point P'(x',y',z') into the point P''(x'',y'',z'') at the projection screen by the matrix transformation:

$$\begin{bmatrix} X'' & Y'' \\ \alpha'' & \beta'' \end{bmatrix} = \begin{bmatrix} \frac{m(X' + Z'\alpha')}{\frac{\alpha'}{m} - \frac{\alpha' Z'}{f}} & \frac{X'}{f} & \frac{m(Y' + Z'\beta')}{\frac{\beta'}{m} - \frac{\beta' Z'}{f}} & -\frac{Y'}{f} \end{bmatrix}$$

In the above expressions, $f$ = the scannner rotation angle, $m$ = the image magnification, $f$ = the lens focal length, and the tangents of the ray angles are given by $\alpha', \beta', \alpha''$, and $\beta''$.

Restricting the analysis to the chief ray (which will indicate the central ray of the fan of rays that construct an image point), permits expressing the tangents of the ray angles as:

$$\alpha' = \frac{-X'}{X' + f}, \quad \beta' = \frac{-Y'}{Z' + f}$$

Choosing a standard 35 mm film format and a typical magnification of 440X, the above relationships have been plotted for a rotation angle of ±7.5°.

To verify these analytical results, a computer analysis was performed to predict off-axis real image tracks for different parameters of design. These plots graphically predict the real image motion on the screen. FIG. 5 discloses these results for a three mirror scanner, that is a combination roof reflector and planar facet with a flat film surface projected with a normal projection lens onto a flat screen surface. Typical values were inserted into the equations for a 35 mm format with a scanner excursion of plus or minus 7.5° and a 440.0 magnification. The screen size was 9.2 by 6.7 meters. The plots are for the principal ray tracks and illustrate the nature and magnitude of image degradation associated with uncompensated scanner devices on the edge of the screen.

An advantage of the scanner assembly of the present invention over that of a number of prior mirror scanners is the fact that the object surface or film medium always maintains a constant distance away from the scanner axis of rotation. As a result of this design parameter, a greater portion of the image format is stabilized during scanner rotation. As can be appreciated, the object surface or film curvature, as well as the virtual image realized on the axis of rotation will have a cylindrical shape with a radius of curvature equal to the scanner radius.

Referring to FIG. 5, it is significant to note that the slope of the real image motion error curves are smallest when the scanner rotation angle is also small. An object of the present invention is to minimize the impact of motion errors on the real image as opposed to trying to eliminate them. Thus, the real image is held in sharp focus across the screen when the scanner rotation angle is small. Thus, the projection lens 6 of the present invention is designed to project a cylindrical object onto a flat screen. It should also be noted that when a scanner rotation angle approaches zero the projected real image will also be the brightest.

Minimum image degradation is therefore achieved by the use of a cylindrical film surface in concert with a projection optics component that utilizes a field flattening element which serves to project the cylindrical film surface onto a flat projection screen while maintaining sharp focus over the full field of view and simultaneously eliminating geometric distortion. Two specific embodiments have been established which satisfy these constraints: a projection lens with a cylindrical or toroidal field flattening element and a relay lens with a cylindrical or toroidal field flattening element at the relayed image plane. Thus, a projection system which generates real images from the virtual image should have an object field curvature characteristic complimentary to the curvature of the film surface to minimize the relative movement of the real offset image point.

It should be noted that this relative movement plotted in FIG. 5 is relatively small compared to the screen size and because of the present illumination system design and focus effects, only about 4° of scanner rotation are clearly focused on the screen. This amount of motion is only about 1 centimeter at the edge of the format for a 440.0X screen and represents less than one minute of arc at the projection lens. One minute of arc is normally the limit of perception of unaided human vision. Of course, the audience will be closer, but three or four minute image motions should not be noticeable in most projector applications. The important thing is that the lens is in focus where the image motion changes are the smallest. The foregoing analysis of the chief ray location as a function of rotation angle will now be complemented by an analysis of the position of best focus attained by all of the rays converging about the chief ray. This analysis will disclose the effect of the illumination source position on the apparent motion of the real image.

As the scanner rotates, the virtual image of the film surface rotates about the scanner rotation axis with the same angular rate and angular displacement as the scanner. A fan of rays diverging from a point P'(x',y',z') located on the virtual image surface will be focused at a point P''(x'',y'',z'') near the projection screen in accordance with the first-order parametric expressions:

$$Y'' = \frac{mh\cos\theta}{1 - \frac{(mh\sin\theta)}{f}}, \quad Z'' = \frac{-m^2 h\sin\theta}{1 - \frac{(mh\sin\theta)}{f}}$$

Note, that the ratio, $$\frac{Z''}{Y''} = -m\tan\theta = -\tan\theta'$$

is the Scheimpflug condition for tilted images. In other words, the image of a plane object surface tilted through an angle $\theta$ will be sharply imaged on a tilted plane surface where the angle of tilt, $\theta'$, is determined by the above equation.

The locus of the sharply focused points produced during the rotation of the scanner is determined by eliminating the dependence upon $\theta$ of the above expressions to obtain:

$$\frac{\left[Z'' - \frac{h^2 m}{f\left(\frac{h^2}{f^2} - \frac{1}{m^2}\right)}\right]^2}{\left[h^2/\left(\frac{h^2}{f^2} - \frac{1}{m^2}\right)^2\right]} - \frac{Y''^2}{\left[h^2/\left(\frac{h^2}{f^2} - \frac{1}{m^2}\right)\right]} = 1$$

The locus of sharply focused points is therefore simply conic section whose origin of coordinates is given by:

$$Z'' = \frac{h^2 m}{f\left(\frac{h^2}{f^2} - \frac{1}{m^2}\right)}$$

Figure 6:
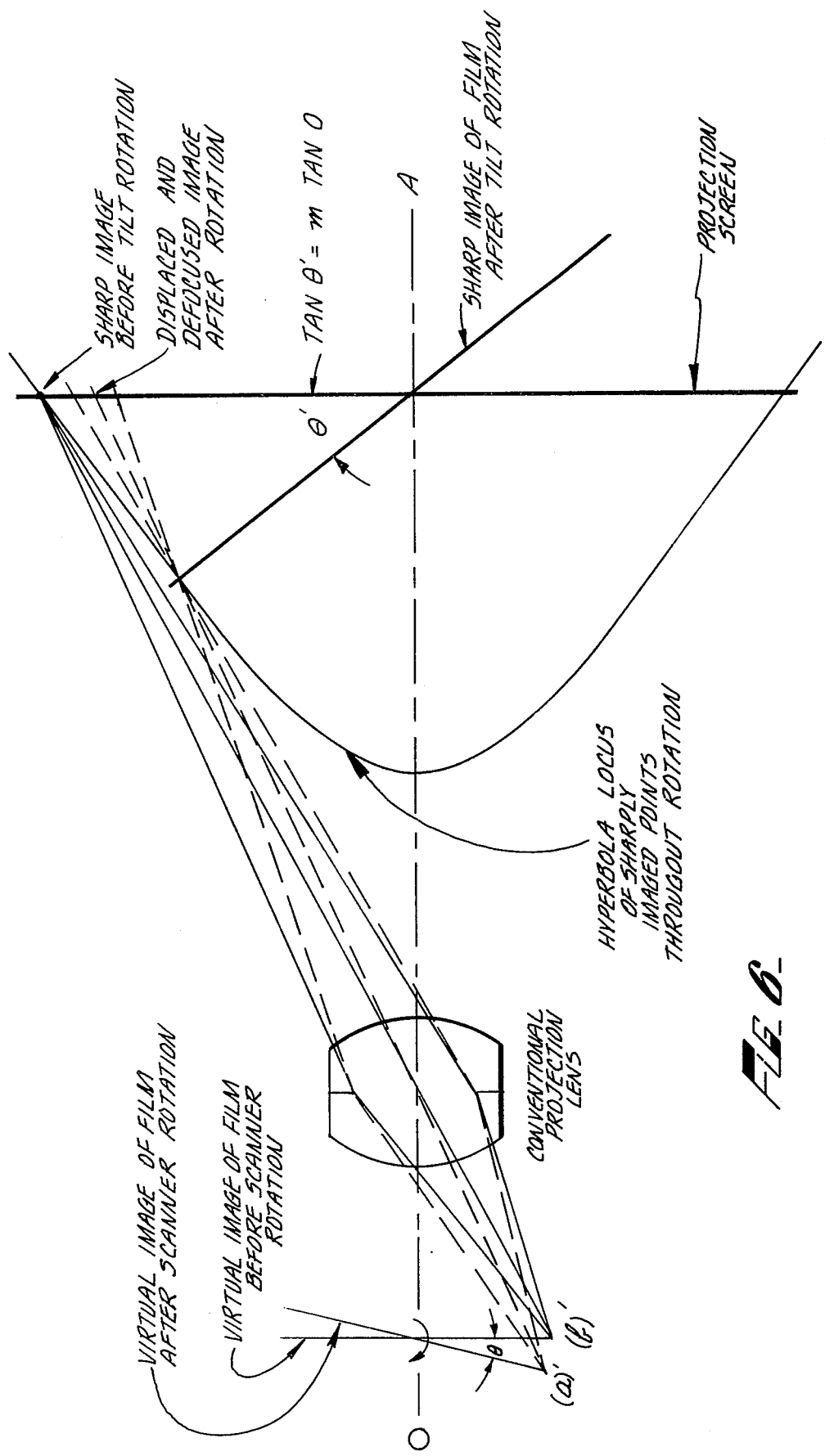
FIG. 6 is a schematic view disclosing the effects of dynamic keystone aberration on a projection screen.
Figure 7:
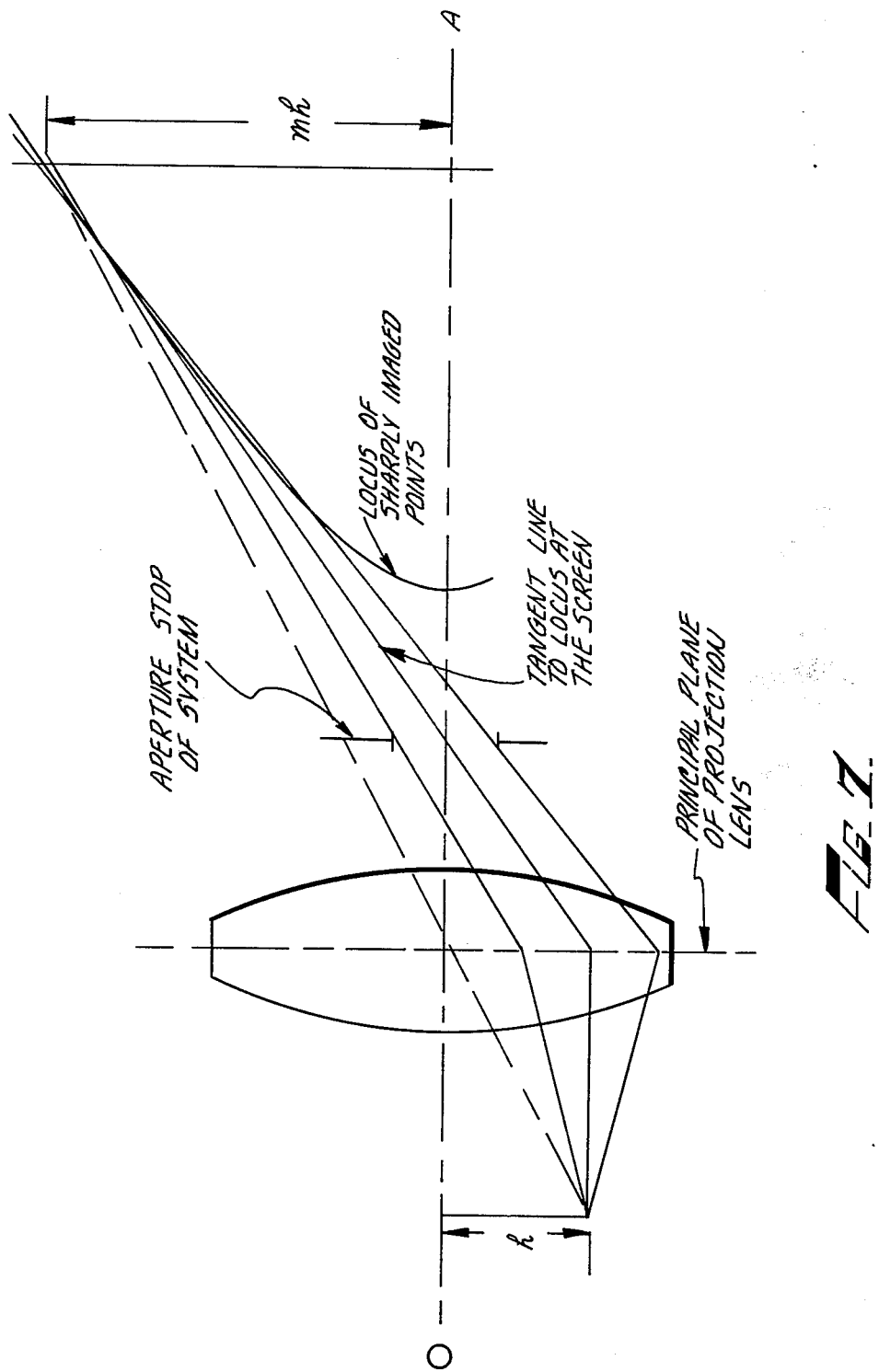
FIG. 7 is a schematic disclosing effects of the illumination projection system of the present invention in minimizing the effects of dynamic keystoning.

These relationships are graphically disclosed in FIG. 6 for the case when $h^2/f^2 > 1/m^2$. The physical interpretation is of considerable significance. The fan of rays which diverge from $P'(x',y',z')$ are sharply focused on the screen when the scanner angle is zero, but as the scanner rotation angle is gradually increased the fan of rays will be sharply focused along the hyperbolic locus and will continue to diverge until they are incident upon the screen. This implies that the real image blur on the screen will both become larger and will appear to move as the scanner rotation angle is increased. The increase in blur size can be substantially reduced, and the motion of the image blur can be minimized by choosing projection optic components having a telecentric property and specific illumination optic components that coordinate film frame illumination, arc source size and entrance pupil dimensions such that the effective transmission of a pencil of rays of the offset virtual image point is limited to substantially a tangential interface with a surface of focused real image point positions. The surface being representative of the effective rotational scan movement of the projected offset real image points formed in space. This condition of the present invention is shown in FIG. 7.

When this condition is met, the image will appear to remain stationary throughout the scanner rotation angle range, but will appear to become progressively softer in focus. Since the image is sharpest when the scanner angle is near zero, and the rate of change of focus (and image motion) is smallest when the scanner rotation angle is near zero, the image perceived by the viewer will appear to be stable and in focus.

Additionally, the condition imposed upon the projection optics components to satisfy the requirement that the chief ray will be tangent to the hyperbolic locus is that the design be telecentric. Telecentricity means that the chief ray of the projection lens must be parallel to the lens optical axis on the object side. The greater the deviation from telecentricity the more pronounced the apparent image motion on the screen.

FIG. 10 discloses one projection lens solution where a toroid field flattener 40 is positioned adjacent the film 18. An astigmatism corrector 42 complements a tessar projection lens 44.

Complimenting the choice of projection optical components is the particular illumination optical components defined herein to further reduce dynamic keystoning. The illumination subsystem 8 provides corrections in two distinct ways; first, operating in concert with a telecentric projection lens the illumination system can restrict the fan of rays to a narrow fan centered about the tangent to the hyperbolic locus of sharp focus; and second, the lamp and illumination optical components can selectively vignette the fan of rays which are projected to the screen.

Three mirror illumination optical system is quite unique by virtue of the fact that it is tailored to work in concert with the particular scanner being used. For example, with the three mirror scanner having the arc image at the entrance pupil of the projection lens the scanning mechanism causes the image of the arc lamp source to move through the entrance pupil as the scanner rotates. A matrix transformation can provide the relationship between a fixed point on the arc lamp source and its projected image in the projection lens entrance pupil when the mirror scanner is rotated. As can be determined from the sequence rotation disclosed in FIGS. 3 and 4 for a three mirror scanner configuration (planar facet plus roof reflector) and also from FIGS. 8 and 9 for the two mirror scanner configuration (planar facet on both upper and lower polygon scanner members), the illumination optics components provide a distinct interaction with the scanner and the projection optics components for selectively illuminating different regions of the real image of each film frame so that the light transmission is progressively decreased in the region wherein the relative movement of the real offset image point becomes progressively greater.

Mathematically, this can be verified by a matrix transformation relating the source point and its image in the projection lens entrance pupil as follows:

$$\begin{bmatrix} X' \\ Y' \\ Z' \end{bmatrix} = \begin{bmatrix} -X + r\sin\theta \\ -Y \\ -Z - r\cos\theta \end{bmatrix} \text{ or } \begin{matrix} X' = -X + r\sin\theta \\ Y' = -Y \\ Z' = -Z - r\cos\theta \end{matrix}$$

The physical implication of the above expression is that there is no cross-term dependence between $x'$ and $z'$ (implying that the image is not rotated in space). The negative signs associated with $x'$ and $y'$ signify that the image is both inverted and reverted in space. The $r\sin\theta$ term in the expression for $x'$ indicates that the arc image is displaced in the projection lens entrance pupil by this amount while the $r\cos\theta$ in the expression for $z'$ indicates that the arc image moves along the optical axis by this very small amount. The net effect for the three mirror configuration that this relationship describes is that the image of the arc will be displaced across the projection lens entrance pupil but will not be rotated in space. By means of this novel arrangement it is possible to select an arc lamp and condenser elements so that the lamp image always remains within the projection lens entrance pupil while vignetting restricts the fan of rays which illuminate the film to the set of rays that are focused by the projection lens along the tangent line to the hyperbolic locus of best focus.

The experimental illumination optics configuration that satisfied the above set of constraints was an HMI A.C. arc lamp with a 12 mm arc length combined with condenser elements that magnify the arc so that its image just filled the projection lens entrance pupil when the scanner is at zero rotation angle. The axis of the arc image must be in the direction in which the film moves so that the arc image will be vignetted in a manner that will minimize the dynamic keystone aberration.

The respective FIGS. 3, 4, 8 and 9 disclose the vignetting for both the three mirror facet and two mirror facet scanner geometry. These views illustrate how the displaced arc image, the rotated virtual image of the film, the effective facet aperture, and the fixed projection lens entrance pupil combined to vignette the ray fan with increasing rotation angle.

The virtual film images rotate about the scanner centerline as previously described. The illumination system arc lamp image, however, is displaced in the direction of motion of the scanner. As the edges of the film being to go out of focus with increasing scanner rotation, the image of the arc lamp source is displaced so that the vignetting introduced by the scanning mirror effective facet aperture allows only the upper portion of the arc image to be incident at the lower portion of the projection entrance pupil; by choosing the pupil to be the same size as the film frame, this arc lamp displacement just compensates for the dynamic keystone aberration by permitting only the restricted fan of rays to pass through the projection lens entrance pupil that will focus along the tangent to the hyperbolic locus of best focus.

Other effects are also present that influence the quality of the perceived screen image. The image goes out of focus with increasing scanner rotation angle at the same rate that the illumination system vignetting reduces the screen brightness. In addition, the illumination across the film frame decreases from a maximum on one edge to a minimum on the other edge. This "shading" is enhanced by the arrangement of the arc lamp and condenser elements so that the minimum illumination occurs when the film defocus is at the greatest value that it will attain.

Figure 8:
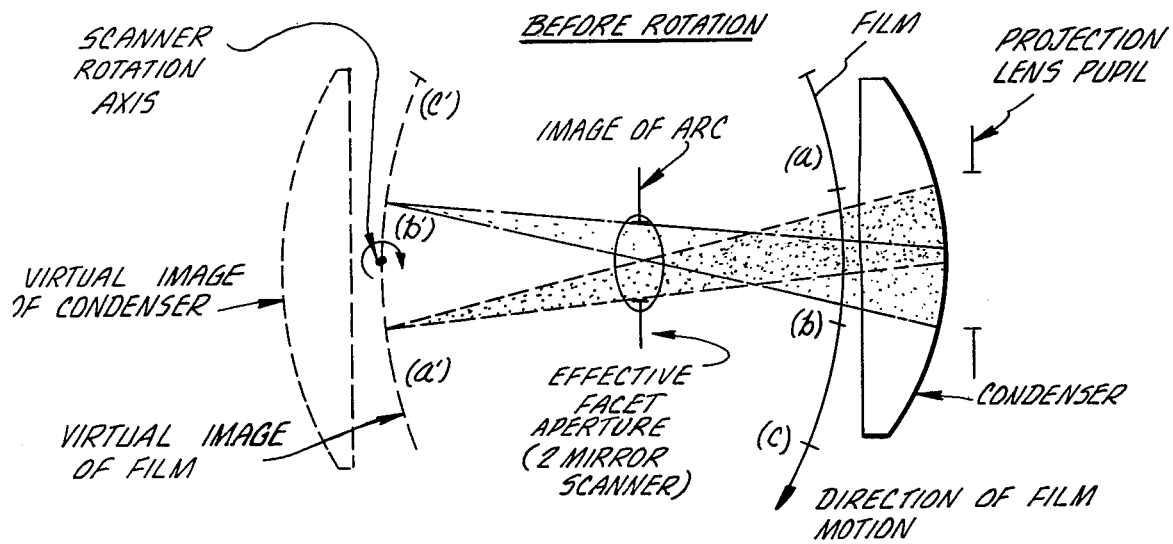
FIG. 8 is a schematic of the two mirror scanner illumination sub-system before rotation.
Figure 9:
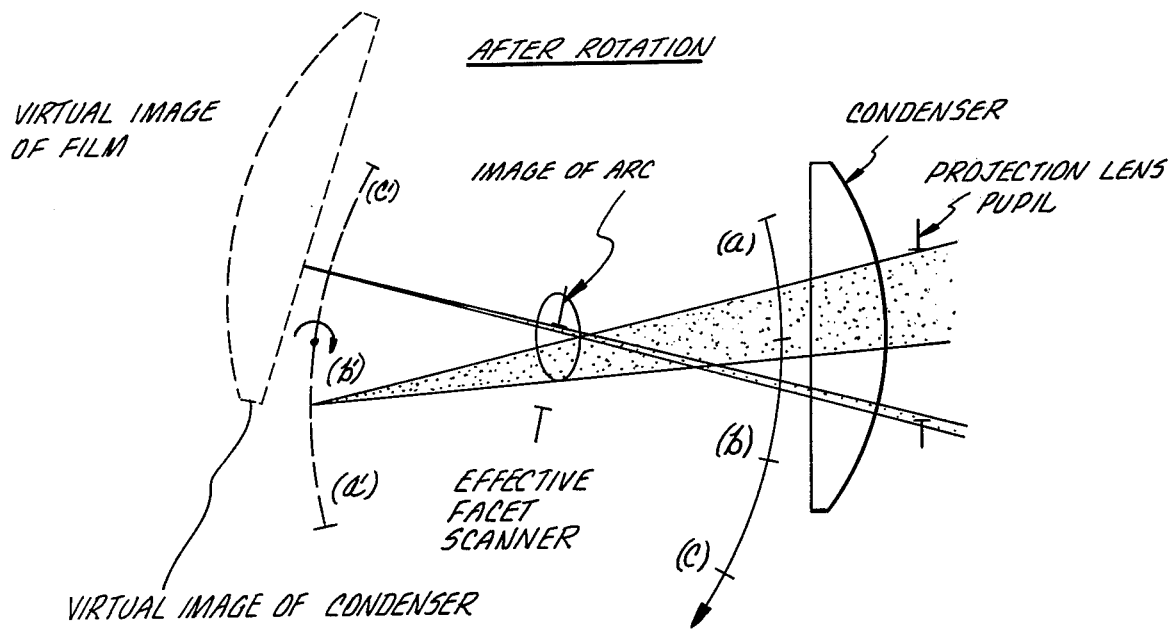
FIG. 9 is a schematic of the two mirror scanner illumination sub-system after rotation.

As can be seen in FIGS. 8 and 9, by increasing the condenser size and reducing condenser focal length to insure illumination of three full frames a two mirror scanner configuration is possible.

Summarizing the above, it can be seen that the present invention recognizes that practical configurations of reflective and/or refractive scanners will experience a dynamic keystone aberration and that the amount of aberration can be only minimized to a modest degree by increasing the number of scanner facets. Accordingly, the present invention provides a particular projection optics and illumination optics that can operate in concert to nullify the perception of the dynamic keystone aberration in the real image by a viewer even with commercial movie projection magnification.

The derivation of the locus of the chief rays intersection point with a surface of best focus indicates that the real image on the screen must be held in sharp focus during that period of time when the scanner rotation angle is nearly zero, due to the fact that the image motion remains small for a large angular range about the zero rotation angle but becomes quite large for the small amount of time when the scanner rotation angle is approaching its maximum value. To maintain sharp focus over the full film frame during the time that the scanner rotation angle is nearly zero requires either a cylindrical or a toroidal field flattening element to project the cylindrical film frame onto a flat screen. The film record must be cylindrical rather than flat, and the design of the field flattening element must also avoid introducing distortion that will contribute to image motion errors.

It should be fully realized that the particular projector lens design can be subjective to a particular application of the continuous projector of the present invention and accordingly, the present invention should not be limited to the specific examples shown herein.

The following conditions would provide sufficient guidelines for an optical designer to provide a specific projection lens;

1. The lens must image the film sharply when the film and scanner facet are in the "head on" position. This implies the lens must be able to image a cylindrical field as flat. Field flatteners near the film are undesirable since scratches or dust may be projected.

2. The lens must have sufficient back focal length to clear the scanner and sharply image the film, i.e., the back focal length must be equal to the radius of the scanner wheel or greater.

3. The exit pupil of the projection lens should be equal to the size of the film format.

4. Minimum dynamic keystoning will result if the lens is designed to be telecentric on the film side.

5. In addition, baffles should be included in the lens or the scanner to eliminate "ghost" images.

6. The numerical aperture (f-number) is determined by the number of facets. The greater the number of facets, the slower must be the projection lens.

The preferred embodiments for the projection optics required to satisfy these conditions consist either of (1) a cylindrical or toroidal field flattening element designed into a projection lens and located in close proximity to the film record, (2) a relay lens with a cylindrical or toroidal element designed to be in close proximity to the relayed image surface so that any commercial projection lens can be utilized for projection of the relayed image surface onto the screen.

While the above embodiments have been disclosed as the best mode presently contemplated by the inventor, it should be realized that these examples should not be interpreted as limiting, because artisans skilled in this field, once given the present teachings, can vary from these specific embodiments. Accordingly, the scope of the present invention should be determined solely from the following claims in which I claim:

What is claimed is:

1. An improved rotatable optical scanner system for the continuous transmission of at least two dimensional successive images relative to a medium such as a film, each object image can be considered to be formed from a number of discrete points comprising;

a source of light energy;

means for creating virtual images of successive objects with at least one virtual image point of each object positioned on a stationary locus point and at least another virtual image point offset from the stationary image locus point and relatively movable during a scanning movement;

means for circuitous curvature of the film about a centroid of the stationary locus point while transmitting the source of light energy, and projection means for generating real images from the virtual image further having an object field curvature characteristic complementary to the curvature of the film surface to minimize the relative movement of the real offset image point and to project a real composite image of perceptively stable registration between the film and real projected image.

2. The invention of claim 1 wherein the source of the light energy is an elongated arc lamp having its longitudinal axis in the same direction as the film movement.

3. The invention of claim 1 wherein the means for creating virtual images is a reflective polygon scanner.

4. The invention of claim 3 wherein the reflective polygon scanner includes a plurality of planar reflective facets.

5. The invention of claim 3 wherein the reflective polygon scanner includes a plurality of matched reflective facets wherein at least one set of reflective facets are roof reflectors.

6. The invention of claim 1 wherein the projection means has a telecentric characteristic to provide a substantially parallel position of the chief rays defining the image to an optical axis of the projection means.

7. The invention of claim 1 wherein the projection means includes a projection lens and an aperture on the real image side of the projection lens.

8. The invention of claim 3 further including baffle means for removing ghost images adjacent the projected real image.

9. The invention of claim 8 wherein the polygon scanner includes plurality of reflective facets and the baffle means are positioned between respective facets.

10. The invention of claim 9 wherein the baffle means are radial spokes.

11. The invention of claim 5 wherein the source of light energy includes a condenser at least twice the size of an object image.

12. The invention of claim 1 wherein the source of light energy includes a condenser at least three times the size of an object image.

13. The invention of claim 1 wherein the projecting means includes a relay lens for creating a stable real image and a conventional projector lens to provide a real projected image.

14. An improved rotatable optical scanner system for the continuous transmission of at least two dimensional successive images from a medium such as film wherein each image is formed from a number of discrete points comprising;
   a source of light energy,
   means for transmitting virtual images of successive film frames illuminated by the light energy with at least one virtual image point of each film frame positioned on a stationary locus point and at least another virtual image point offset from the stationary virtual image locus point and relatively movable during a scanning movement, and
   means for generating real images from the virtual image, and
   vignetting means for selectively illuminating different regions of the real image of each film frame so that the light transmission is progressively decreased in the region of each film frame where the relative movement of the real offset image point becomes progressively greater.

15. The invention of claim 14 wherein the means for generating real images includes a projection lens having an entrance pupil, the means for transmitting virtual images includes a movable scanner which causes an image of the light source to move through the projection lens entrance pupil as the scanner moves.

16. The invention of claim 14 wherein the means for transmitting virtual images includes a movable scanner with a plurality of reflective facets, the movement of the scanner causes an image of the light source to move through the effective aperture of the reflective facet.

17. The invention of claim 15 wherein the means for transmitting virtual images includes a plurality of reflective facets that vignette the light transmission so that rays of light will focus along the tangent of a surface of sharply focused real image point positions, the surface being representative of an effective rotational scan movement of the projected offset real image point.

18. An improved rotatable optical scanner system for the transmission of at least two dimensional successive images of objects which can be considered to be formed from a number of discrete points comprising;
   means for creating virtual images of successive objects with at least one virtual image point of each object positioned on a stationary locus point and at least another virtual image point offset from the stationary virtual image locus point and relatively movable during a scanning movement,
   means for generating real images from the virtual image, and
   means for limiting the effective transmission of a pencil of rays of the offset virtual image point from an object to substantially a tangential interface with a surface of focused real image point positions, which is representative of the effective rotational scan movement of the projected offset real image point whereby the resulting transmission registration of object and real image points are perceptively stable to a viewer.

19. The invention of claim 14 wherein the light source further includes an illumination system and means for moving the film medium having successive images of objects through the illumination system.

20. The invention of claim 19 wherein the illumination system includes an elongated source of light having its longitudinal axis in the same direction as the film movement.

21. The invention of claim 19 wherein the means for transmitting virtual images is a reflective polygon scanner.

22. The invention of claim 21 wherein the reflective polygon scanner includes a plurality of planar reflective facets.

23. The invention of claim 21 wherein the reflective polygon scanner includes a plurality of matched reflective facets wherein at least one set of reflective facets are roof reflectors.

24. The invention of claim 18 wherein the projection means has a telecentric characteristic to provide a substantially parallel position of the chief rays defining the image to an optical axis of the projection means.

25. The invention of claim 24 wherein the projection means includes a projection lens and an aperture on the real image side of the projection lens.

26. The invention of claim 21 further including baffle means for removing ghost images adjacent the projected real image.

27. The invention of claim 26 wherein the polygon scanner includes plurality of reflective facets and the baffle means are positioned between respective facets.

28. An improved rotatable optical scanner system for the continuous transmission of at least two dimensional successive images of objects which can be considered to be formed from a number of discrete points comprising;
   means for creating virtual images of successive objects with at least one image point of each object positioned on a stationary locus point and at least another image point offset from the stationary virtual image locus point and relatively movable during a scanning movement, and a telecentric projection lens assembly for generating real images from the virtual image with the generated real offset image point having substantially only a radial component relative to a planar image plane, any tangential component of the real image point being prevented by the constant magnification characteristics of the telecentric property.

29. A continuous projection system for projecting successive real images along an optical axis comprising;

a movable scanner mechanism for folding the optical axis and creating a virtual image, projection means for generating a real image from the virtual image, the projection means having a telecentric characteristic whereby the chief rays are parallel to the optical axis in the object space, and illumination means for selectively providing a source of light energy to different regions of the real image so that the light transmission through the scanner mechanism and projection means is progressively decreased in the region of the real image that has the greatest rate of defocussing and image motion.

30. An image immobilization system for transmitting successive objects into real images along an optical axis comprising;

means for movably mounting a sequentially framed medium in a curvilinear position about rotation axis;

a source of light energy illuminating at least two full frames through the curvilinear portion of the medium;

scanner means for creating a virtual image of each frame so that at least one image point of each frame is positioned on a stationary locus point to provide successive registration of frames and having a rotation axis coincidental with the rotation axis of the medium curvilinear position;

projection means for generating a real image from the virtual image, the projection means having a telecentric characteristic whereby the chief rays in object space are parallel to the optical axis, and having a back focal length substantially coinciding with the stationary locus point, the projecting means further including means for complementing the curvilinear medium shape, and means for selectively vignetting the light energy so that light transmission to the real image is progressively decreased in that region of the real image that has the greatest rate of defocussing whereby the viewer will perceive a stable registration of successive real image projections.

* * * * *

UNITED STATES PATENT AND TRADEMARK OFFICE
CERTIFICATE OF CORRECTION

PATENT NO. : 4,126,386
DATED : November 21, 1978
INVENTOR(S) : ULRICH M. FRITZLER It is certified that error appears in the above-identified patent and that said Letters Patent are hereby corrected as shown below:

In Col. 2, line 3 delete "2,937,378" and insert --1,937,378--.

In Col. 3, line 14 delete "2,997,280" and insert --2,972,280--.

In Col. 4, line 23 delete "tangetial" and insert --tangential--.

In Col. 9, line 29 delete "f" and insert --θ--.

In Col. 9, line 39 delete "$\frac{-X'}{X'+t}$" and insert -- $\frac{-X'}{Z'+t}$ --

Signed and Sealed this

Twenty-fourth Day of April 1979

[SEAL]

Attest:

RUTH C. MASON
Attesting Officer

DONALD W. BANNER
Commissioner of Patents and Trademarks